United States Patent [19]

Smith et al.

[11] 3,999,375
[45] Dec. 28, 1976

[54] FUEL CONTROL

[75] Inventors: Lawrence S. Smith, Simsbury, Conn.; Charles F. Stearns, East Longmeadow, Mass.

[73] Assignee: United Technologies Corporation, Hartford, Conn.

[22] Filed: Mar. 18, 1975

[21] Appl. No.: 559,478

[52] U.S. Cl. .......................... 60/39.27; 60/39.28 R; 60/39.29

[51] Int. Cl.² ...................... F02C 9/10; F02C 9/14

[58] Field of Search .................... 60/39.27, 39.28 R

[56] References Cited

UNITED STATES PATENTS

| | | | |
|---|---|---|---|
| 2,931,168 | 4/1960 | Alexander | 60/39.27 X |
| 2,938,339 | 5/1960 | Clarke | 60/39.27 |
| 3,091,080 | 5/1963 | Crim | 60/39.27 X |
| 3,103,785 | 9/1963 | Williams | 60/39.27 X |
| 3,187,505 | 6/1965 | Plummer | 60/39.28 R |
| 3,521,447 | 7/1970 | Rogers | 60/39.27 X |
| 3,803,929 | 4/1974 | Karol | 60/39.27 X |

*Primary Examiner*—Clarence R. Gordon
*Attorney, Agent, or Firm*—John D. Del Ponti; Norman Friedland

[57] ABSTRACT

The 3-D cam utilized for acceleration scheduling of a fuel control for a turbine type of power plant is also utilized to schedule the position of the stator vanes of the power plant and to provide speed and temperature schedules for idle and maximum speed. A single follower responding to the same profile on the cam controls both stator vane position and idle speed. The stator vane and idle speed contour on the 3-D cam controls idle speed through a single linkage and readjusts the $W_f/P_3$ ratio lever to adjust fuel flow.

6 Claims, 6 Drawing Figures

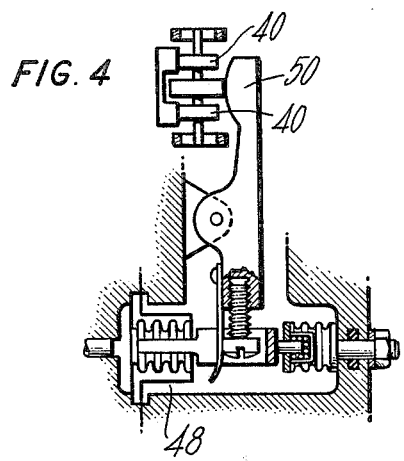
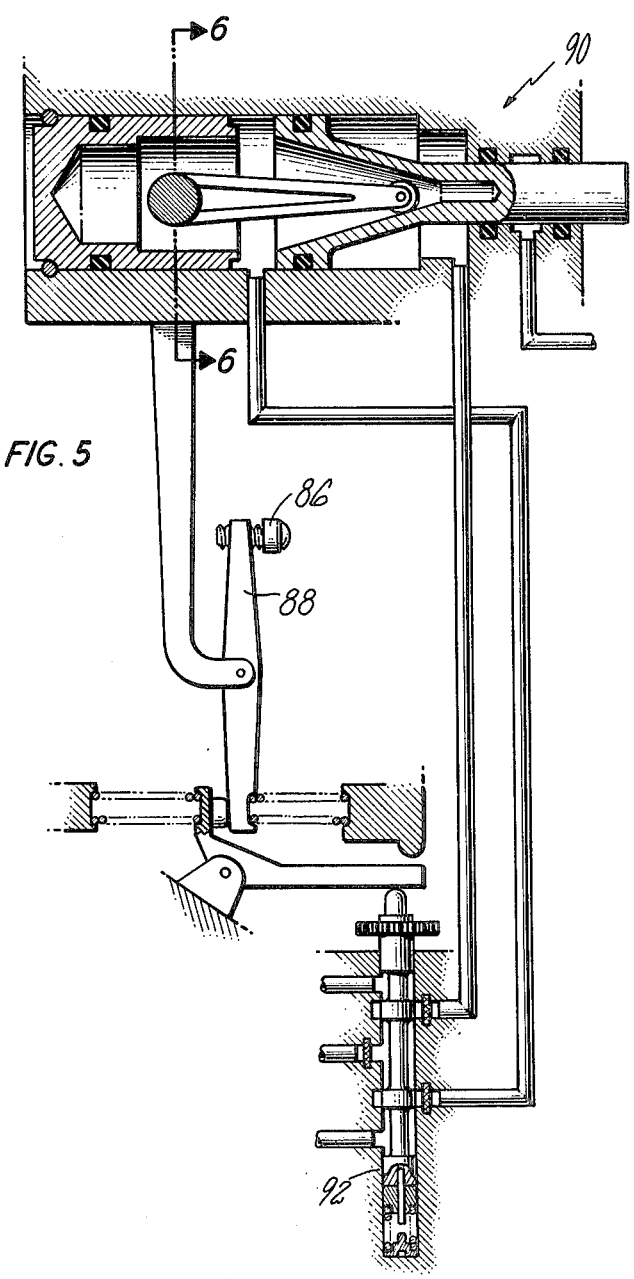
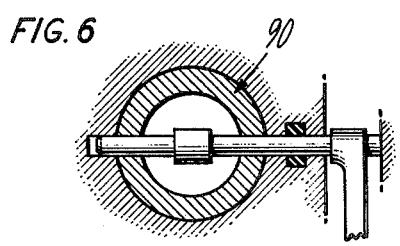

FUEL CONTROL

BACKGROUND OF THE INVENTION

This invention relates to fuel controls for turbine types of power plants and particularly to the means for resetting idle speed.

This invention constitutes an improvement over the fuel control idle reset mechanism disclosed in a copending application filed on even date entitled "Fuel Control" by Charles F. Stearns and assigned to the same assignee.

As disclosed in said co-pending U.S. patent application Ser. No. 559,458 the 3-D cam is utilized to control stator vane position and idle speed. It also discloses the concept of utilizing a single cam follower operating off of one profile of the cam to readjust fuel flow. However, in the aforementioned patent application the input to the idle reset operates through the acceleration scheduling linkage through a relatively complex spring and linkage arrangement. Moreover, the output through the linkage operates through a torque summation lever system that controls a pilot valve that establishes a given area ratio for establishing a pressure relationship with its cooperating throttle valve. This invention contemplates simplifying the system described in the aforementioned patent application by applying the idle reset signal directly to the multiplying lever and thereby eliminate the spring and attendant hardware that would otherwise be necessary. The speed lever is operated by a three point lever system so that it responds to the most fuel demand signal and hence preventing reset below flight idle.

SUMMARY OF THE INVENTION

An object of this invention is to provide for a $W_f/P_3 \times P_3$ type fuel control for a turbine type of power plant improved means for controlling idle speed. ($W_f$ equals fuel flow in pounds per hour and $P_3$ is compressor discharge pressure.)

A still further object of this invention is to provide in a fuel control as described a simple linkage system for governing idle speed.

A still further object of this invention is to provide a fuel control as described a three point lever system that selects the most of two values so as to assure that reset does not occur below idle speed.

Other features and advantages will be apparent from the specification and claims and from the accompanying drawings which illustrate an embodiment of the invention.

BRIEF DESCRIPTION OF THE DRAWINGS

FIG. 4 is a view taken along lines 4—4 of FIG. 1.

FIG. 5 is a view partly in schematic and partly in section illustrating another portion of the fuel control and particularly the stator vane control. FIG. 6 is a view partly in section and partly in elevation taken along lines 6—6 of FIG. 5.

DESCRIPTION OF THE PREFERRED EMBODIMENT

This invention constitutes an improvement over the fuel controls that are manufactured by Hamilton Standard Division of United Aircraft Corporation of the type typified by the JFC-12, JFC-25 and JFC-60 and of the type disclosed in U.S. Pat. No. 2,822,666 granted to S. G. Best on Feb. 11, 1958 and assigned to the same assignee. Inasmuch as much of the control is similar to the controls mentioned above for further details reference should be made thereto.

In the fuel controls noted above the fuel flow ($W_f$) is scheduled by providing an open looped scheduling signal $W_f/P_3$ which in turn is multiplied by actual $P_3$. The typical multiplication system as is exemplified by these JFC-25 and JFC-60 fuel control models is to use a balanced fulcrum lever and position the rollers or movable force input signal relative to the fulcrum point. The force proportional to $P_3$ is applied to these rollers so that it creates a moment arm which computes the multiplication function.

Hence in the heretofore known systems the position of the rollers is made a function of speed, power lever position, compressor inlet temperature, compressor speed and/or other engine operating parameters so as to provide the proper or desired fuel flow for steady state operation, acceleration and deceleration.

This invention finds particular utility in a fuel control based on the above mentioned function and which also utilizes the 3-D cam to control the position of the stator vanes.

Thus, the fuel control serves to meter fuel to the engine in proper amounts and also adjust the stator vanes to a predetermined schedule. As can be seen in FIGS. 1-6 the fuel control comprises basically the metering system shown in FIG. 1, the computer system shown in FIGS. 1-4 and the stator vane actuator and control shown in FIGS. 5 and 6.

Figure 1:
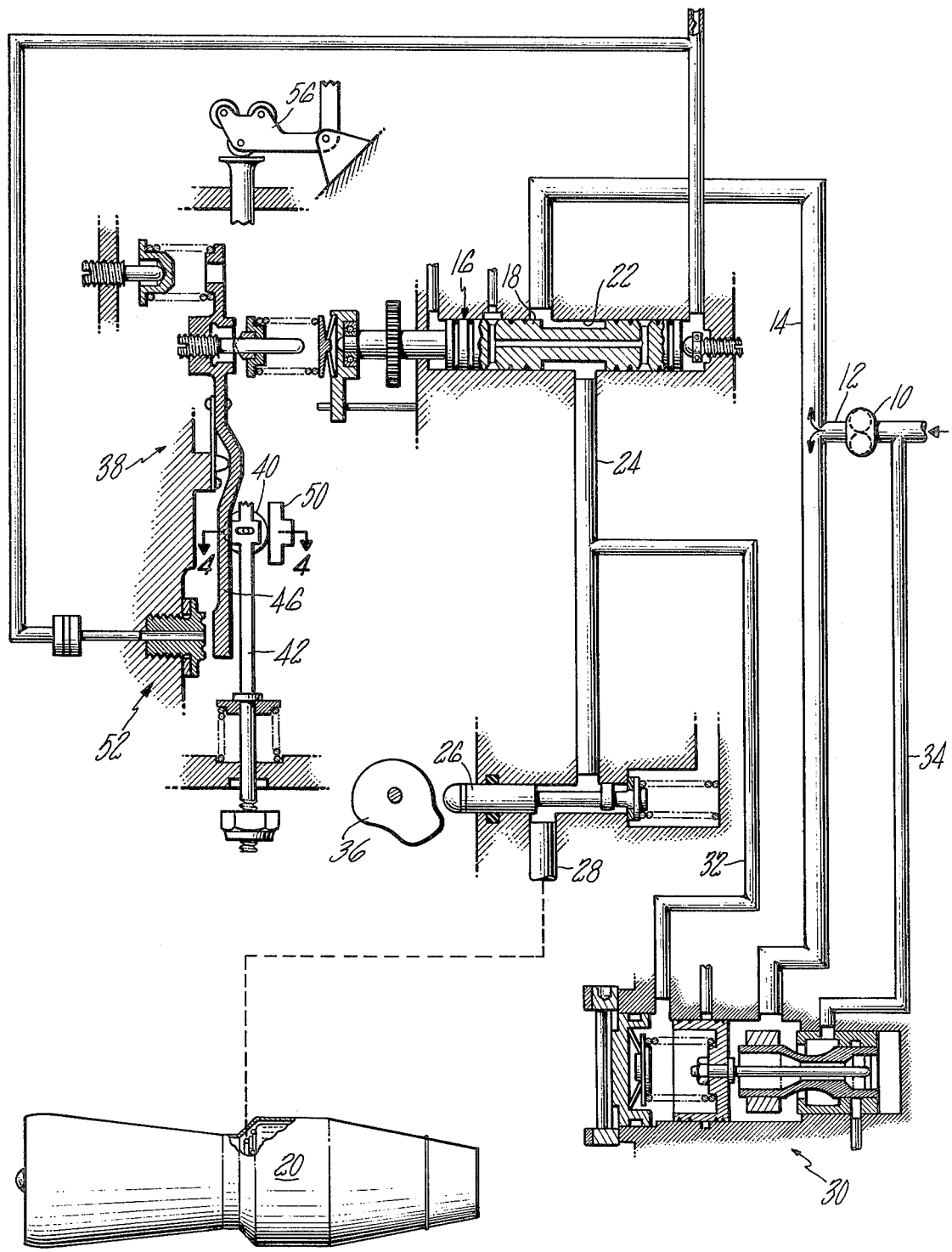
FIG. 1 is a view partly in schematic and partly in section illustrating a portion of the fuel control.
Figure 3:
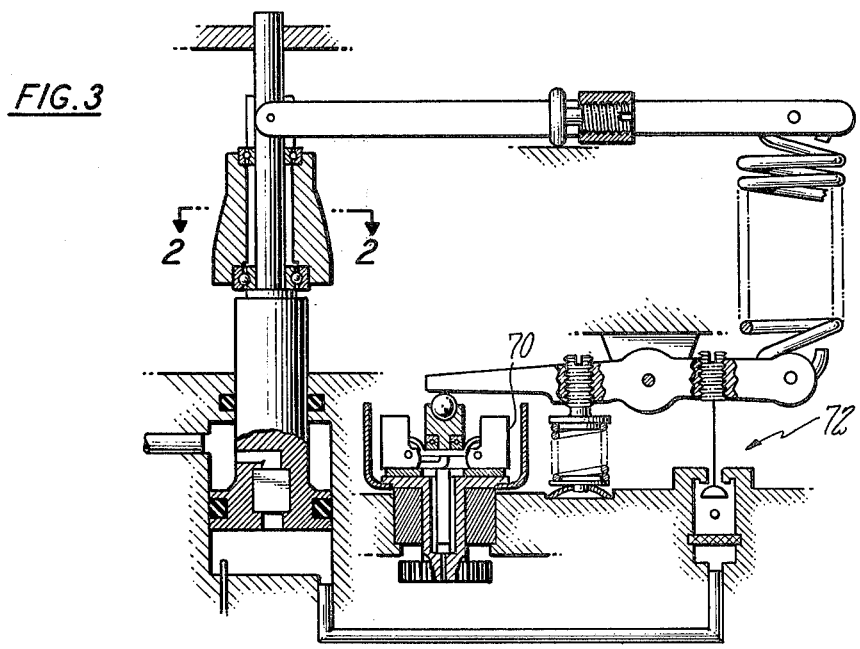
FIG. 3 is a view partly in schematic and partly in section illustrating the fuel control and particularly the 3-D cam.

Looking particularly at FIG. 1 the metering system comprises a suitable pump 10 that pressurizes the fuel and delivers it through lines 12 and 14 to the rotating throttle valve 16. Throttle valve 16 is the subject of a co-pending application Ser. No. 559,477, now U.S. Pat. No. 3,953,967 entitled "Servoed Throttle Valve for Fuel Control" filed on even date by Lawrence S. Smith and assigned to the same assignee and for more details reference should be made thereto. Suffice it to say that land 18 establishes the metering area establishing the amount of fuel for delivery to the burner section of engine 20 via annular passage 22, line 24, shut-off valve 26 and line 28.

As is well known the pressure drop across the metering orifice of the throttle valve is maintained constant by a suitable pressure regulator which measures pressure upstream and downstream via lines 14 and 32 and ports the excess fuel to the inlet of pump 10 via line 34.

For the sake of convenience and simplicity the details of the pressure regulator are omitted herefrom and the pressure regulator details are disclosed in connection with models JFC-12, JFC-25 and JFC-60 and are incorporated by reference herein.

A suitable well known shut-off valve 26 positioned by cam 36 in response to the power lever (not shown) may be incorporated.

The multiplication system generally illustrated by reference numeral 38 is well known and the details are likewise omitted herefrom for the sake of simplicity.

Suffice it to say that rollers 40 are positioned by rod 42 as a function of $W_f/P_3$ along fulcrummed lever 46. A force indicative of actual $P_3$ sensed by suitable $P_3$ sensor 48 is applied to rollers 40 via platen 50. A suitable $P_3$ sensor and its attendant mechanism is also disclosed in the model JFC-12, JFC-25 and JFC-60 fuel controls as well as the U.S. Pat. No. 2,822,666 supra. This linkage serves to multiply $W_f/P_3$ by $P_3$ so as to position through the servo valve generally indicated by numeral 52, throttle valve 16 to produce the scheduled fuel flow.

Figure 2:
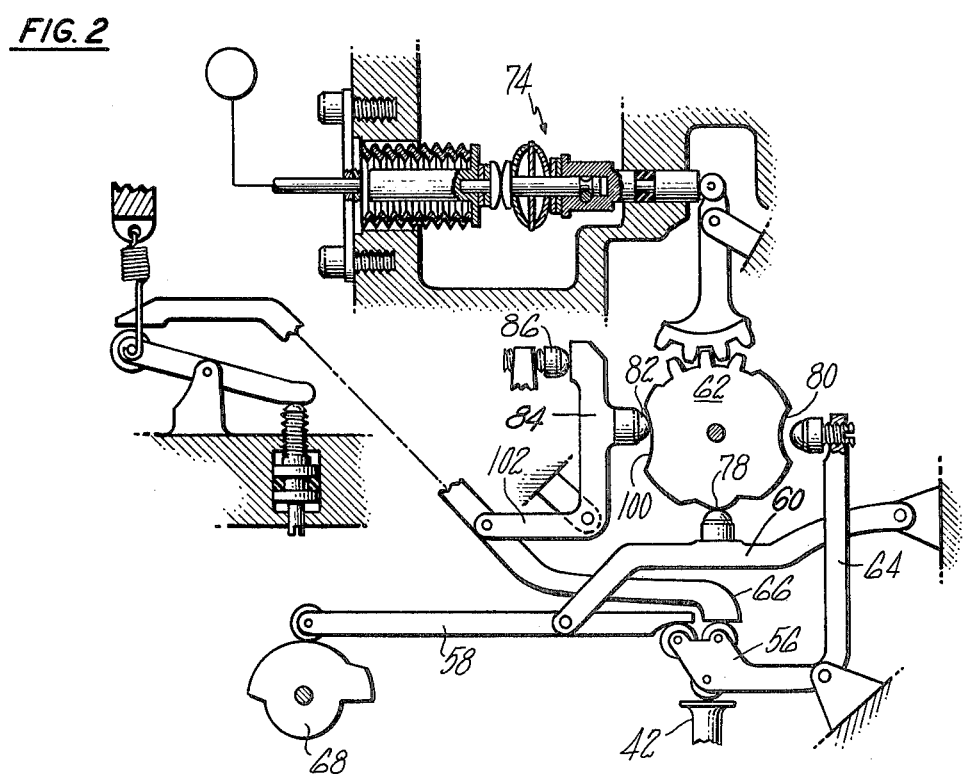
FIG. 2 is a view partly in schematic and partly in section taken along line 2—2 of FIG. 3 illustrating another portion of the fuel control and particularly the 3-D cam.

As can be seen in FIG. 1 the position of the $W_f/P_3$ rollers is controlled by the three point link 56 whose function will be described hereinbelow. Referring now to FIG. 2 showing the three point link 56 being positioned by link 58 responding to power lever position or power turbine speed error (not shown) in the event that the control is utilized with a free turbine engine, link 60 responding to maximum governing as determined by the position of 3-D cam 62, link 64 responding to the acceleration schedule produced by cam 62, and link 66 for scheduling idle, also determined by cam 62.

The power setting cam 68 and acceleration scheduling and maximum governing are well known and since they are not important to an understanding of the invention a detailed description thereof is omitted for the sake of convenience and simplicity. The 3-P cam 62 is positioned axially by compressor speed sensed by speed sensor 70 and its attendant servo control generally illustrated by numeral 72 and is rotated by temperature sensor and its attendant mechanics generally indicated by numeral 74.

Suffice it to say that 3-D cam 62 is moved axially as a function of compressor speed and rotated as a function of compressor inlet temperature so that the schedules of maximum governing and acceleration are defined by the appropriate profiles 78 and 80 formed on cam 62.

A noted follower 82 positions link 84 which in turn abuts against element 86 carried on one end of lever 88. The purpose of lever 88 is to position stator vane actuator 90 and accomplishes this by positioning pilot valve 92 to port high pressure to either side of the actuator piston. The actuator is disclosed and claimed in a co-pending U.S. patent application Ser. No. 559,459 entitled "Actuator with Feedback" filed by Robert Sherman on even date and assigned to the same assignee and for further details reference should be made thereto.

In accordance with this invention, the profile 100 formed on cam 62 serves the dual function of scheduling the stator vane position and the idle speed and the mechanism for the idle speed control comprises the bell crank lever 102 which connects with the idle trim lever 66 adapted to cooperate with the three point link 56. Hence the three point link adjusts the position of $W_f/P_3$ ratio lever 42 to control idle speed as a function of compressor speed and compressor inlet temperature. By virtue of the three point link 56 any of the input signals can be overridden such that the engine speed will not be set below the idle condition.

It should be understood that the invention is not limited to the particular embodiment shown and described herein but that various changes and modifications may be made without departing from the spirit or scope of this novel concept as defined by the following claims.

We claim:

1. For a fuel control for a turbine type power plant scheduling both fuel flow and stator vane position, said fuel control having means responsive to power plant operating parameters including a 3-D cam for scheduling acceleration and idle speed providing a first signal indicative of a ratio of fuel flow and compressor pressure, said 3-D cam also scheduling stator vane positions, means responsive to actual compressor pressure for producing a second signal, means including a fulcrumed lever and a movable link for applying a force to said fulcrumed lever at different distances from the fulcrum for multiplying said first and second signals, said cam having a profile formed thereon providing the stator vane schedule, means responsive to said profile for positioning said movable link in accordance with the idle schedule for controlling the flow of fuel to said power plant.

2. For a fuel control as claimed in claim 1 including a three-point link having one point operably connected to said link and another point connected to one schedule provided by said 3-D cam and another point connected to said idle speed schedule of said 3-D cam.

3. For a fuel control as claimed in claim 2 wherein said stator vane includes independent control means, a follower member pivotably mounted intermediate its ends to bear upon said profile, one end of said follower operatively connected to said three-point link and the other end operatively connected to said independent control means.

4. For a fuel control as claimed in claim 1 wherein said operating parameters include at least compressor temperature and compressor speed.

5. For a fuel control as claimed in claim 4 wherein said 3-D cam rotates in response to compressor temperature and translates in response to compressor speed.

6. For a fuel control as claimed in claim 3 including a rate adjustment link having one end bearing against said three-point link and its other end being mechanically adjustable, said follower being pivotally connected to said rate adjustment link intermediate its ends.

* * * * *